United States Patent [19]
Rutherford et al.

[11] Patent Number: 5,116,627
[45] Date of Patent: May 26, 1992

[54] CHEWING GUM CONTAINING COMPOSITIONS FOR CONTROLLED RELEASE OF FLAVOR BEARING SUBSTANCES AND PROCESS FOR PRODUCING SAME

[75] Inventors: Howard J. Rutherford, Highlands; Nayan Desai, Freehold; Keith McDermott, Bound Brook; Charles Wiener, Middletown, all of N.J.

[73] Assignee: International Flavors & Fragrances Inc., New York, N.Y.

[21] Appl. No.: 666,036

[22] Filed: Mar. 7, 1991

[51] Int. Cl.⁵ .............................................. A23G 3/33
[52] U.S. Cl. ........................................ 426/5; 426/96; 426/305; 426/307; 426/310; 426/534
[58] Field of Search ................... 426/5, 96, 99, 305, 426/306, 307, 310, 534

[56] References Cited

U.S. PATENT DOCUMENTS

| | | | |
|---|---|---|---|
| 2,886,440 | 5/1959 | Kramer et al. | 99/135 |
| 2,886,445 | 5/1959 | Rosenthal et al. | 99/135 |
| 2,886,446 | 5/1959 | Kramer et al. | 99/135 |
| 2,886,449 | 5/1959 | Rosenthal et al. | 99/135 |
| 3,920,849 | 11/1975 | Marmo et al. | 426/3 |
| 4,259,355 | 8/1979 | Marmo et al. | 426/5 |
| 4,816,265 | 3/1989 | Cherukuri et al. | 426/5 |
| 4,940,588 | 7/1990 | Sparks et al. | 424/490 |
| 4,963,369 | 10/1990 | Song et al. | 426/5 |
| 4,978,537 | 12/1990 | Song | 426/5 |
| 4,981,698 | 1/1991 | Cherukuri et al. | 426/5 |
| 5,000,965 | 3/1991 | Killeen et al. | 426/5 |
| 5,004,595 | 4/1991 | Cherukuri et al. | 426/5 |

FOREIGN PATENT DOCUMENTS 9060061 6/1990 World Int. Prop. O. ............. 426/5

OTHER PUBLICATIONS

PCT Published Application No. 90/08478, Published on Aug. 9, 1990, Zibell, et al., filed on Jan. 25, 1990.

*Primary Examiner*—Jeanette Hunter
*Attorney, Agent, or Firm*—Arthur L. Liberman

[57] ABSTRACT

Described is a chewing gum comprising a chewing gum base having dispersed therein, separately, a multiplicity of sweetener bearing polymeric particles and/or flavor-bearing polymeric particles, said polymeric particles further comprising:
(a) at least one water-soluble normally solid polymer;
(b) at least one water-insoluble normally solid polymer;
(c) and either
(i) at least one flavor composition a substantial portion of which is incorporated in the water-insoluble polymer and a substantial portion of which is incorporated in the water-soluble polymer; and/or
(ii) at least one sweetener composition a substantial portion of which is incorporated in the water-insoluble polymer and a substantial portion of which is incorporated in the water-soluble polymer;

the water-soluble polymer and the water-insoluble polymer being physically associated with each other associated in such a manner that one is in the form of a multiplicity of discrete entities in a matrix of the other. Also described is a process for preparing such a chewing gum.

1 Claim, 13 Drawing Sheets

FIG.15
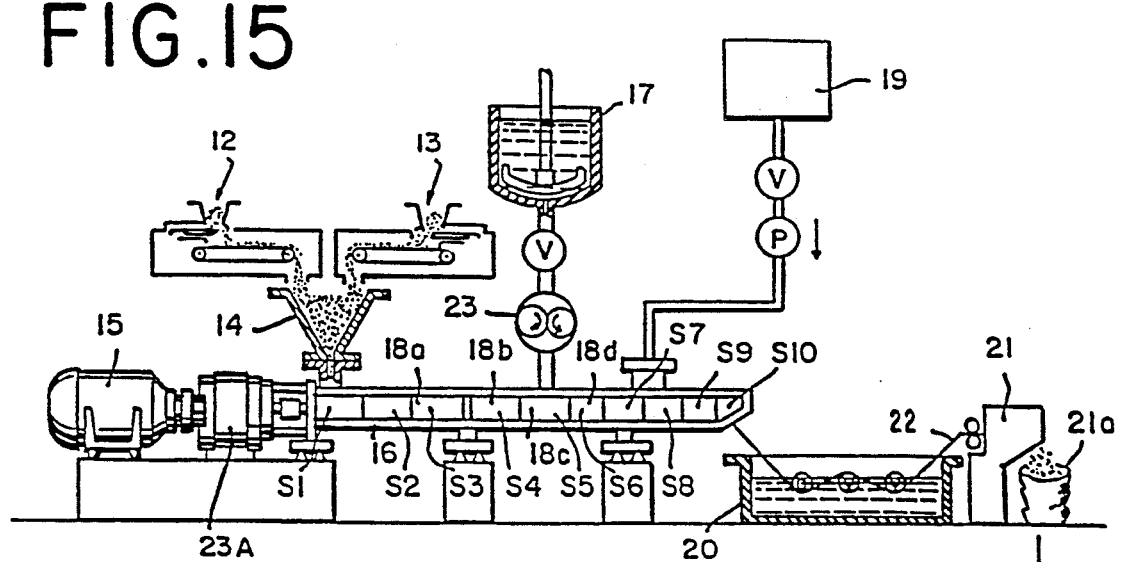
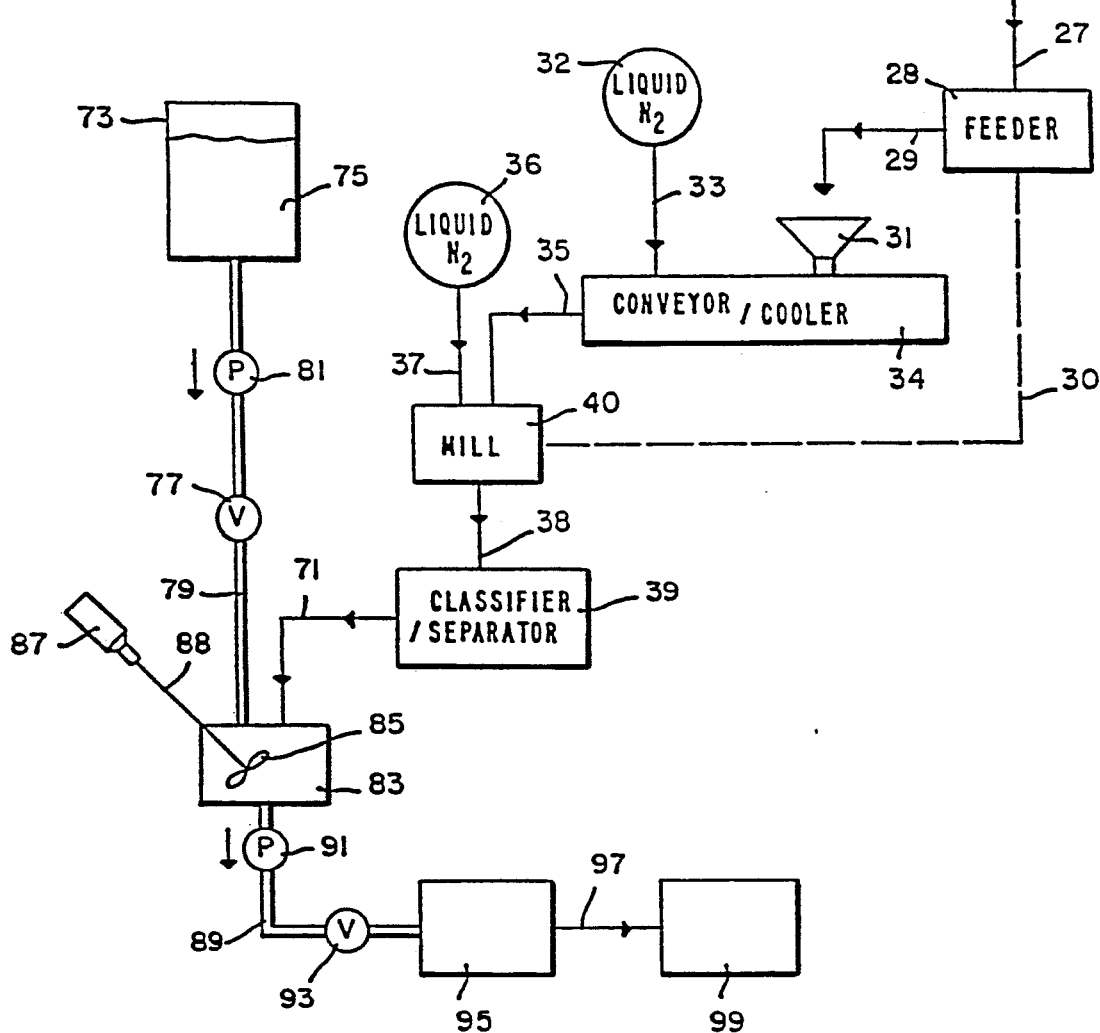

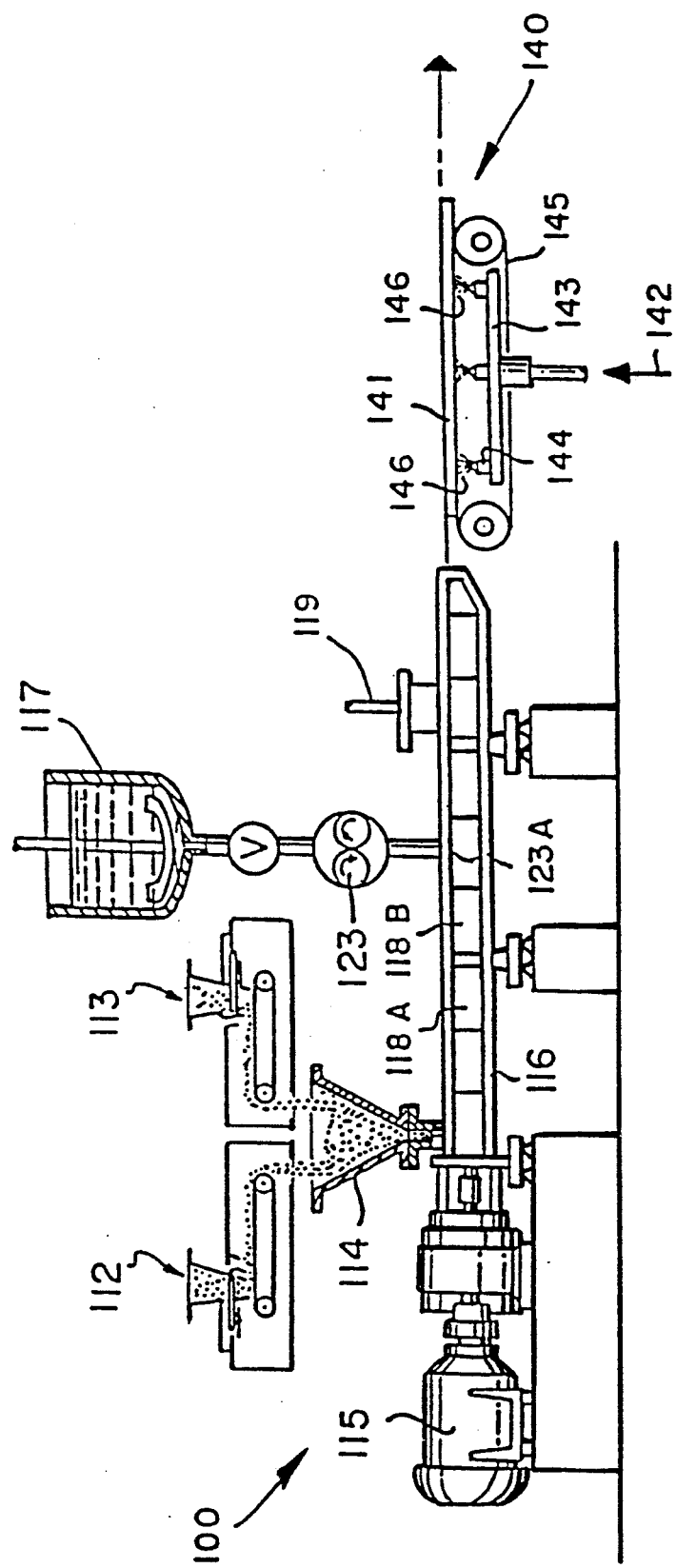

CHEWING GUM CONTAINING COMPOSITIONS FOR CONTROLLED RELEASE OF FLAVOR BEARING SUBSTANCES AND PROCESS FOR PRODUCING SAME

BACKGROUND OF THE INVENTION

This invention relates to improved orally utilizable compositions such as chewing gum having a flavor with good initial strength and which flavor is controllably released (under the hydrolytic conditions of the human mouth cavity) at a consistently high level over an extended period of time; to processes for preparing such orally utilizable compositions; to flavor compositions useful in preparing same and to processes for preparing such specially useful flavoring compositions.

The term "orally utilizable compositions" includes such materials as chewing gum, chewable medicinal tablets such as chewable vitamin tablets, chewing tobacco and toothpaste.

There has been considerable work performed relating to orally utilizable substances such as chewing gum, chewable medicinal tablets, chewing tobacco and toothpaste whereby such orally utilizable substances have a flavor impact both initially and over an extended period of time. Problems have arisen in attempting to create such orally utilizable compositions wherein part of the flavor is available for immediate results whereas another part provides the effect of such flavor gradually over extended periods of time. Such problems include the continuous distribution of "initial impact" and "extended release" flavor over the entire mass of the orally utilizable composition as well as commercial manufacture of same.

U.S. Pat. No. 1,526,039, for example, teaches that if an essential oil or flavoring is combined with chewing gum base in a finely divided condition, and the particles of the flavoring or oil are encased in a suitable covering so as not to contact directly the gum during manufacture, the deleterious effect of the flavoring on the gum is prevented or largely reduced. It is further stated therein that:

"When the emulsion is added to the gum base, it is thoroughly mixed therewith by the usual means employed for mixing the flavoring material with such base. The production of the emulsion serves to break up the essential oil into fine particles and to encase these particles in the emulsifying material, so that when the emulsion is added to the gum mass, the essential oil to a large degree is prevented from coming into direct contact with the base, and from having deleterious action thereon."

U.S. Pat. No. 2,886,440 teaches a method of preparing a chewing gum characterized by "extended flavor perception time, true flavor character, and high degree of flavor release comprising the steps of forming spray-dried emulsion of a volatile, water-immiscible flavoring agent encapsulated within finely divided particles of gelatin, and substantially uniformly distributing said gelatin encapsulated flavoring agent within an all-enveloping mass of a chewable gum base". The use of separate "fixed" and "unfixed" flavor portions is also taught but there is no disclosure therein of the principal of this invention, to wit, mixing the fixed and unfixed flavor portions with a suspension agent prior to adding to the chewing gum base.

U.S. Pat. No. 2,886,446 teaches a chewing gum comprising (i) smaller particles of gelatin characterized by faster liberation of flavor and (ii) larger particles of gelatin characterized by slower liberation of flavor, each of the gelatin particles containing dispersed therewithin, in dried emulsion form, discrete micro-droplets of a volatile water-immiscible flavoring agent, and an all-enveloping mass of a chewable gum base within which the particles are substantially uniformly distributed whereby the flavor is released substantially evenly and uniformly over the extended chewing time.

U.S. Pat. No. 2,886,445 teaches that:

"It is possible to obtain a flavoring composition, particularly adapted for use in chewing gum which permits attainment of a product characterized by extended flavor preception time, true flavor character, and release of a large proportion of flavoring agent. This flavoring composition comprises finely divided particles of a dried hardened gelatin emulsion containing discrete micro-droplets of a volatile, water-immiscible flavoring agent. Preparation of the flavoring composition of this invention may be effected by encapsulating discrete micro-droplets of volatile, water-immiscible flavoring agent within finely divided particles of a dried emulsion of hardened gelatin."

U.S. Pat. No. 2,886,449 teaches:

"A chewing gum containing a flavoring composition characterized by an extended flavor perception time, true flavor character, controlled release of a large portion of flavoring agent, and reduction in amount of flavor oil required (which) may be prepared by the process comprising forming a gelatin-coacervated flavor, and substantially uniformly distributing said gelatin-coacervated flavor within an all-enveloping mass of a chewable gum base. The product chewing gum comprises ... finely divided particles of coacervated gelatin containing a water-immiscible flavoring agent therewithin and an all-enveloping mass of a chewing gum base within which the particles are substantially distributed."

The utilization of sustained released flavor containing capsules in such materials as chewing gum and medicinal tablets is also taught in British Patent No. 1,205,764.

The use of sustained release flavor capsules in conjunction with polyethylene glycols (which are taught to be employed to disolventize the capsules) is set forth in British Patent No. 1,318,799.

Furthermore, described in U.S. Pat. No. 3,920,849 may be either chewing gum compositions, chewable medicinal tablets, chewing tobacco or toothpaste having an oral intake, a high flavor intensity release substantially evenly and uniformly, over an extended oral utilization time in the mouth cavity; the orally utilizable compositions containing a non-confined flavor oil, a flavor oil which is physically entrapped in solid particles and a suspending agent such as silica, xanthan gum and ethyl cellulose; the non-confined flavor oil, the entrapped oil and the suspension agent being premixed prior to addition to either of the chewing gum base, the chewing tobacco or the chewable medicinal tablet base or the toothpaste base.

U.S Pat. No. 4,259,355 issued on Mar. 31, 1981 discloses orally utilizable compositions which may be either chewing gum compositions, chewable medicinal tablets, chewing tobacco or toothpaste having an oral intake, a high flavor intensity release substantially evenly and uniformly over an extended oral utilization time in the mouth cavity; the orally utilizable compositions containing a non-confined flavor oil, a flavor oil which is physically entrapped in solid particles and a suspending agent which is hydroxypropyl cellulose; the nonconfined flavor oil, the entrapped flavor oil and the suspension agent being premixed prior to addition to either of the chewing gum base, the chewing tobacco or the chewable medicinal tablet base or to the toothpaste base.

U.S. Pat. No. 4,940,588 issued on Jul. 10, 1990 discloses a controlled release powder containing discrete micro-particles for use in edible, pharmaceutical and other controlled release compositions. In U.S. Pat. No. 4,940,588 the micro-particles have a average size in the range of from 0.1 to 125 milli microns; and each of the micro-particles is in the form of a micromatrix of an active ingredient uniformly distributed in at least one non-toxic polymer. The micro-particles of U.S. Pat. No. 4,940,588 have a predetermined release of active ingredient when the dissolution rate thereof is measured according to the Paddle Method of U.S. Pharmacopoeia XX at 37° C. and 75 rpm.

U.S. Pat. No. 4,963,369 issued on Oct. 16, 1990 discloses a chewing gum comprising a chewing gum base having dispersed therein plural populations of water-insoluble polymeric beads having microporous passages impregnated with a flavoring agent, each population of beads being coated with a coating material having a solubility in water different from the coating in other populations. U.S. Pat. No. 4,963,369 also discloses a method of making such a chewing gum with controlled-release flavoring comprising the steps of:

(i) providing a chewing gum base;

(ii) dispersing within a chewing gum base a first population of water-insoluble polymeric beads having microporous passages impregnated with a flavoring agent, and wherein said beads are coated with a coating material having a desired solubility in water; and (iii) dispersing within the chewing gum base a second population of water-insoluble polymeric beads having microporous passages impregnated with a flavoring agent, which solubility is different from that of the coating material used on said first population of beads to thereby provide a release rate of the active ingredients from the first population of beads.

PCT Published Application 90/08478 published on Aug. 9, 1990 (corresponding to U.S. Application Ser. No. 306,924 filed on Feb. 6, 1989) also discloses a food product that contains porous polymeric beads impregnated with flavoring components and a method of making such a food product.

More specifically, PCT Application 90/00461 discloses a food product having dispersed in it water-insoluble porous polymeric beads that have microporous passages in them and impregnated with one or more food flavorings containing volatile substances.

PCT Published Application 90/00461 also discloses that the beads can be coated with water-soluble coatings to entrap the flavorings in the beads until the beads are exposed to water. Alternatively, the beads of PCT Application 90/00461 can be coated with a coating that melts when heated so that the flavoring will not be released until the food is heated.

Nothing in the prior art however, sets forth the unobvious, advantageous chewing gum composition and flavor-containing particles useful in such chewing gum composition of our invention.

SUMMARY OF THE INVENTION

Briefly, our invention describes a chewing gum comprising a chewing gum base having dispersed therein, separately, sweetener bearing polymeric particles and/or flavor-bearing polymeric particles, which polymeric particles comprise:

(a) at least one water-soluble normally solid polymer;

(b) at least one water-insoluble normally solid polymer;

(c) and either (i) at least one flavor composition a portion of which is incorporated in the water-insoluble polymer and a portion of which is incorporated in the water-soluble polymer; and/or;

(ii) at least one sweetener composition a portion of which is incorporated in the water insoluble polymer and a portion of which is incorporated in the water-soluble polymer;

the water-soluble polymer and the water-insoluble polymer being physically associated with each other and in such a manner that one is in the form of discrete entities in a matrix of the other.

A chewing gum of this invention when masticated slowly but continuously releases the active chewing gum ingredients entrapped in the polymeric matrix as described above. As the gum is hydrated during mastication, active gum ingredients such as sweeteners, flavoring agents, plasticiers, pharmaceutical agents or breath freshening agents will be extracted slowly from the chewing gum in a controlled release manner and in a sustained release manner.

In the present invention, a chewing gum includes any chewable and substantially water-insoluble gum base in an amount ranging from approximately 5 to 99% but preferably about 25% of the total chewing gum composition. The gum base may contain a calcium carbonate filler or a talc filler. The insoluble gum base generally includes elastomers, resins, fats and oils, waxes, softeners and inorganic fillers. Elastomers may include polyisobutylene, isobutylene-isoprene copolymer, styrene-butadiene, rubber as well as natural latexes, such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline, and natural waxes such as beeswax and carnauba.

The gum base typically also includes a filler component such as calcium carbonate, magnesium carbonate, talc, dicalcium phosphate and the like. The filler may constitute between about 5% up to about 60% by weight of the gum base. Preferably, the filler comprises about 5% up to about 50% by weight of the gum base.

Gum bases typically also include softeners including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further include softeners, sweeteners and flavoring agents and combinations thereof. Softeners are added to the chewing gum in order to optimize the chewability and mouthfeel of the gum. Softeners, also known in the art as plasticizers and plasticizing agents, generally constitute between about 0.5% up to about 15% by weight of the chewing gum. Softeners contemplated by the present invention include glycerine, lecithin, and combinations thereof. Further, aqueous sweetener solutions such as those containing sorbitol, hydrogenated starch, hydrolysates, corn syrup and combinations thereof may be used as softeners and binding agents in gum. The gum also includes flavoring agents from about 0.1% to 10% (preferably, from about 0.5% to about 3.0%) of the gum. The flavoring agents may comprise essential oils, synthetic flavors, or mixtures thereof, including but not limited to, oils dried from plants and fruits such as citrus oils, fruit essences, peppermint oil, spearmint oil, clove oil, oil of wintergreen, anise, and the like. Artificial flavoring components are often included. Those skilled in the art will recognize that natural and artificial flavoring agents may be combined in any sensorially acceptable blends. All such flavors and flavor blends are contemplated by the present invention.

Optional ingredients in the gum base include colors, emulsifiers and pharmaceutical agents.

In general, the present invention contemplates a process for preparing a sustained release and controlled release chewing gum product capable of a sustained release and controlled release of flavors and/or sweeteners comprising the steps of:
(a) mixing a water-soluble polymer in the water-insoluble polymer to form a first polymer blend;
(b) adding to the polymer blend at least one sweetener composition; and/or at least one flavor composition;
(c) mixing the resulting blend to form a second polymer blend;
(d) cooling the resulting second polymer blend to a substantially solid state to form a substantially solid blend;
(e) grinding the resulting substantially solid blend to form a particulate substantially solid flavor and/or sweetener composition; and
(f) admixing the resulting particulate substantially solid flavor and/or sweetener composition with a chewing gum base as described above.

In the alternative, the present invention contemplates a process for preparing a chewing gum product capable of sustained release and continuous release and controlled release of a flavor and/or sweetener on mastication comprising the steps of:
(A) preparing a particulate flavor and/or sweetener composition comprising the steps of:
(a) mixing a water-soluble polymer and a water-insoluble polymer to form a first polymer blend;
(b) adding to the polymer blend at least one first sweetener composition and/or at least one first flavor composition;
(c) mixing the resulting blend to form a second polymer blend;
(d) cooling the resulting second polymer blend to a substantially solid state to form a sub-substantially solid blend; and
(e) grinding the resulting substantially solid blend to form a particulate substantially solid flavor and/or sweetener composition;
(B) mixing a chewing gum base with at least one second sweetener and/or a second flavor composition to form a sweetened and/or flavored chewing gum base; and
(C) admixing the particulate substantially solid flavor and/or sweetener composition with a sweetened and/or flavored chewing gum base.

In the alternative the present invention also contemplates the process for preparing a chewing gum product capable of sustained and controlled release of sweeteners and/or flavors on mastication comprising the steps of:
(a) mixing a water-soluble polymer in a water-insoluble polymer to form a first polymer blend;
(b) adding to the polymer blend at least one sweetener composition;
(c) mixing the resulting blend to form a second polymer blend;
(d) cooling the resulting second polymer blend to a substantially solid state to form a substantially solid blend;
(e) grinding the resulting substantially solid bland to form a particulate substantially solid sweetener composition;
(f) mixing a water soluble polymer and a water insoluble polymer to form a third polymer blend;
(g) adding to the third polymer blend at least one flavor composition;
(h) mixing the resulting blend to form a fourth polymer blend;
(j) cooling the resulting fourth polymer blend to a substantially solid state to form a substantially solid blend;
(k) grinding the resulting substantially solid bland to form a particulate substantially solid flavor composition;
(m) admixing simultaneously or sequentially the resulting particulate substantially solid flavor and sweetener compositions with a chewing gum base.

In the alternative, the present invention also contemplates a process for preparing a chewing gum product capable of sustained and controlled release of flavors and/or sweeteners on mastication comprising the steps of:
(A) preparing a particulate flavor and/or sweetener composition comprising the steps of:
(a) mixing a water-soluble polymer and a water-insoluble polymer to form a first polymer blend;
(b) adding to the polymer blend at least one sweetener composition;
(c) mixing the resulting blend to form a second polymer blend;
(d) cooling the resulting second polymer blend to a substantially solid state to form a substantially solid blend;
(e) grinding the resulting substantially solid blend to form a particulate substantially solid sweetener composition;
(f) mixing a water-soluble polymer and a water-insoluble polymer to form a third polymer blend;
(g) adding to the third polymer blend at least one flavor composition;.
(h) mixing the resulting blend to form a fourth polymer blend;
(j) cooling the resulting fourth polymer blend to a substantially solid state to form a substantially solid blend;
(k) grinding the resulting substantially solid blend to form a particulate substantially solid flavor composition;
(B) mixing the chewing gum base with at least one second sweetener and/or a second flavor composition to form a sweetened and/or flavored chewing gum base; and (C) admixing simultaneously or sequentially the particulate substantially solid flavor and sweetener compositions with the sweetened and/or flavored chewing gum base.

Accordingly, it will be understood from this description that the matrix or continuous phase of the sweetened and/or flavored particle can be water soluble and the dispersed entities can be water insoluble or the matrix can be water insoluble and the dispersed entities can be water soluble. In certain aspects of this invention, two types of particles can be produced for utilization in the same system; that is, one particulate olfactory polymer wherein the matrix is water-insoluble and the dispersed entities are water-soluble and another particulate olfactory polymer wherein the matrix is water-soluble and the dispersed entities are water-insoluble.

The weight ratio of water-soluble polymer to water-insoluble polymer can be varied from about 5:95 to about 95:5. In certain preferred embodiments, the ratio of water-soluble to water-insoluble polymer is from about 20:80 to 80:20. Depending upon the ratio and the particular polymer or polymers used for the water-soluble polymer or for the water-insoluble polymer, the matrix will be one particular species and the dispersed entities will be the other particular species of polymers.

As taught herein, the flavor and/or sweetener composition-containing polymer according to the present invention is in particulate form. The size of the particles can readily be varied to provide the desired function of the particulate olfactory polymer. Thus, the relative quantities of water-soluble and water-insoluble polymers can be varied to obtain the desired effect. In the use of the particulate flavor and/or sweetener polymers, a greater quantity of water-soluble dispersed entities will release a greater quantity of the flavor nuance and/or sweetener nuance impression during mastication of the chewing gum.

It will be understood by those skilled in the art from the present disclosure, that the particle size and relative ratio of water-soluble to water-insoluble polymer can be varied to release a lesser proportion of the flavor and/or sweetener composition during mastication initially and a greater quantity on continuous mastication of the chewing gum. Of course, the quantity of flavor and/or sweetener composition released on mastication will depend on the nature of the particular individual's physiology with regard, for example, to the pH of the saliva at different times during the mastication cycle of the chewing gum.

The particle size in certain embodiments of the invention is an important attribute of the particulate flavor and/or sweetener polymer.

In general, taking the instance of a matrix of water-insoluble polymer, the greater the quantity of water-soluble discrete entities, the larger the particle size can be to provide the desired release of flavor and/or sweetener composition. Particle sizes of 6000 micrometers and more can be used. In certain preferred embodiments, it is desirable at high levels of water-soluble discrete entities that the particle size not exceed about 3000 micrometers in average diameter. As the quantity of water-soluble discrete entities decreases, it is preferred that the overall particle size of the particulate olfactory polymer also be decreased. In general, in the practice of the invention with water-soluble discrete entities, the particle size can range from about 200 to about 1000 micrometers in average diameter.

When the water-soluble polymer is the matrix, the overall particle size of the particulate flavor and/or sweetener polymer again depends upon the use to be made of the particulate flavor and/or sweetener polymers, and can be varied widely. It has been found desirable that the particle size for particulate flavor and/or sweetener polymers with water-soluble polymers the matrix can be non larger than about 500 micrometers. In certain desired embodiments, the average diameter ranges from about 100 to 400 micrometers.

It will be understood from this description that the water-soluble polymer matrix can be formulate to dissolve more or less rapidly in an aqueous medium. Thus, such a particle can be formulated to dissolve relatively slowly, and thereby release flavor and/or sweeteners relatively slowly in a more alkaline pH mastication cycle, and then to dissolve more rapidly in a more pH neutral mastication cycle; depending on other foodstuffs consumed prior to simultaneous with or subsequent to the mastication of the chewing gum containing the flavor and/or sweetener particles.

The particulate flavor and/or sweetener polymer particles in certain aspects of this invention can also include a functional chemical. This functional chemical can itself be a polymer. Whether or not the functional chemical is a polymer, an olfactory composition can also be contained in or with the functional chemical such as a breath freshener or pharmaceutical composition.

The flavor and/or sweetener composition can also be included in the pores or interstices of the polymer matrix as well as in the water-soluble and water-insoluble polymers. In other embodiments, the flavor and/or sweetener composition can be in the pores or interstices as well as in the water-soluble polymer, depending upon the nature of the constituents.

The water-soluble polymers which are used in certain desired embodiments include:
(i) a polymer resulting from the polymerization of
  (a) ethylene oxide and ethylene glycol; or
  (b) ethylene oxide, propylene oxide and ethylene glycol;
(ii) polyvinyl pyrrolidone;
(iii) water-soluble cellulosics;
(iv) polyvinyl alcohol;
(v) polyvinyl methyl ether;
(vi) water-soluble polyamides (including polyacrylamides, e.g., cationic and anionic polyacrylamides such as RETEN ® 210 and RETEN ® 220 manufactured by Hercules Inc., Wilmington, Del.);
(vii) water-soluble polyurethanes;
(viii) polyethylene oxides; or
(ix) polymers of acrylic acid and/or methacrylic acid; and/or methyl acrylate and/or ethylacrylate and/or methyl methacrylate and/or ethyl methacrylate; or mixtures of two or more of the foregoing.

Thus, in certain embodiments, a polyethylene glycol having a weight average molecular weight of from about 4,000 up to 20,000 can be utilized. Indeed, while polyethylene glycols are preferred in certain embodiments, other suitable water-soluble polymeric materials are the condensation products of $C_{10}$–$C_{20}$ alcohols or $C_8$–$C_{18}$ alkyl phenols with sufficient ethylene oxide, i.e., more than 50% by weight of the polymer, so that the resultant polymer (a) is soluble in water and (b) has a melting point of above about 35° C. Preferred polymers contain at least about 70% ethylene oxide by weight and more preferred polymers contain at least about 80% ethylene oxide by weight. Polymers based on the addition of ethylene oxide and propylene oxide to propylene glycol, ethylene diamine and trimethylol are commercially available under the names, PLURONICS®, PLURONIC®R, TETRONIC® and PLURADOTS® available from BASF Wyandotte Corporation, Wyandotte, Mich. Corresponding non-proprietary names of the first three trademark materials are Poloxamer, Meroxapol and Polyoxamine.

Examples of water-soluble hydroxyalkyl carboxalkyl celluloses include hydroxyethyl carboxymethyl cellulose, hydroxyethyl carboxyethyl cellulose, hydroxymethyl carboxymethyl cellulose, hydroxypropyl carboxymethyl cellulose, hydroxypropyl carboxyethyl cellulose, hydroxypropyl carboxypropyl cellulose, hydroxybutyl carboxymethyl cellulose, and the like. Also useful are alkali metal salts of these hydroxyalkyl carboxyalkyl celluloses, particularly and preferably in the sodium and potassium derivatives.

Vinylpyrrolidone and methyl vinyl ether polymers can be used as water-soluble polymers in the practice of this invention, as can cationic acrylamide polymers, available from Hercules Corporation Wilmington, Del., under the trade designations RETEN® 210, 220 and 300.

The normally solid water-soluble organic polymer components of the invention should be immiscible with (that is, capable of forming a separate solid phase in) the water-insoluble polymer components. This facilitates formation of a network of pores in the matrix of the particulate flavor and/or sweetener polymer.

The various water-soluble polymers shown in U.S. Pat. No. 4,018,729, such as cellulose ethers and quaternary nitrogen cellulose ethers, are useful in the practice of this invention.

The water-insoluble thermoplastic polymers which can be used in certain desired embodiments of the practice of this invention include:

(i) polyethylene;
(ii) polypropylene;
(iii) copolymers of ethylene and a higher alpha-olefin materials such as propylene and hexene-1;
(iv) poly(epsilon-caprolactone);
(v) polyvinyl chloride;
(vi) polyesters resulting from the polymerization of (a) maleic anhydride and/or phthalic anhydride and/or terephthalic acid and (b) ethylene glycol and/or propylene glycol and/or ethylene oxide and/or 1,2-propylene oxide;
(vii) copolymers of vinyl chloride and vinyl acetate;
(viii) copolymers of vinyl chloride and ethylene and/or propylene;
(ix) copolymers of vinyl acetate and ethylene and/or propylene and/or 2-butene and/or 2-methyl-1-propene;
(x) thermoplastic polyurethanes derived from diisocyanates and polyols;
(xi) polyamides;
(xii) polyester polyamides;
(xiii) thermoplastic polyurethanes derived from diisocyanates and polyol polyesters;
(xiv) butadiene styrene rubber type polymers;
(xv) isobutylene-isoprene copolymers (also known as "butyl rubber").

Preferred materials are polyethylene having a molecular weight in the range of 2,000–21,000; polyisobutylene having a minimum molecular weight of 37,000; polyvinyl acetate having a minimum molecular weight of 2,000; butyldiene-styrene rubber; and isobutylene-isoprene copolymer (butyl rubber). These particular polymers are listed under approved masticatory substances under 21 C.F.R. §172.615 entitled "chewing gum base".

Other water-insoluble polymers useful in the practice of this invention are those described in U.S. Pat. No. 4,618,629, the specification for which is incorporated herein by reference. For example, a polyurethane produced by reacting toluene-2,4-diisocyanate with a glycol adipate ester having a hydroxyl number of approximately 60 and a molecular weight of from about 2,000 up to about 2,500 in the presence of N-ethyl morpholine can be used in the practice of this invention.

Water-soluble polyamides shown in German Offenlegungsschrift No. 36 15 514 incorporated herein by reference can also be used.

Examples of water-insoluble polyamides useful in practicing this invention are set forth in Japan Kokai No. 62/79808, incorporated herein by reference. Examples of water-insoluble polypropylene polymers useful in the present invention are in Japan Kokai No. 62/71502.

Examples of polyesters useful in the present invention, such as poly(ethylene terephthalate) and mixtures of polypropylene and poly(ethylene terephthalate), are shown in Polymer Engineering Science, 1987, Volume 27(9), pages 622–6 incorporated herein by reference. Polycarbonates and polycarbonate/acrylonitrile-butadiene-styrene blends which can be useful herein are set forth in Polymer Engineering Science, 1987, Volume 27(9), pages 632–9 incorporated herein by reference.

Useful thermoplastic polyurethane elastomers comprising polyester polyols (obtained from polyols, polyacids, or anhydrides and epsilon-caprolactone) and polyisocyanates, the polyesterpolyols of which are composed of 0–90 mole percent polyesterpolyols (m.p. about 30° C., molecular weight 1,000–10,000) from polyhydric alcohols, 30–100% of which are $C_3$–$C_{10}$ branched diols, and 30–80% epsilon-caprolactone and 10–100 mole percent polyester polyols are shown in Japan Kokai No. 61/276814 incorporated herein by reference. Other water-soluble polymers which can be used herein are thermoplastic polyurethane-type materials such as the thermoplastic polyester-polyurethane rubbers shown in Japan Kokai No. 62/53321 the specification for which is incorporated herein by reference.

Other water-insoluble polyamides useful in the practice of this invention are set forth in U.S. Pat. No. 4,670,522, the specification for which is incorporated herein by reference.

Still other suitable water-insoluble thermoplastic polyurethane resins useful in the practice of this invention are mentioned in U.S. Pat. No. 4,676,975 incorporated herein by reference.

It is preferred in the practice of this invention to utilize a high-shear mixing device to disperse the separate entities of the one polymer through the matrix of the other polymer In a batch process, a unit such as a Banbury mixer can be used. For continuous processing, it is preferred to use an extruder.

In practicing the process of this invention to form the particulate flavor and/or sweetener polymers, single screw or double screw extruders can be utilized. Some of the extruders that can be used are shown at pages 246–267 and 332–349 of the Modern Plastics Encyclopedia, 1982–1983.

More particularly, examples of extruders which are desirable for carrying out the process of the invention include:

1. The Krauss-Maffei twin screw extruder manufactured by the Krauss-Maffei Corporation/Extruder Division, 3629 West 30th Street, Wichita, Kans. 67277;
2. The CRT ("Counter-Rotating Tangential") Twin Screw Extruder manufactured by Welding Engineers, Inc., King of Prussia, Pa. 19406;
3. The Leistritz Twin Screw Dispersion Compounder manufactured by the American Leistritz Extruder Corporation, 198 U.S. Route 206 South, Somerville, N.J. 08876;
4. The ZSK Twin Screw Co-Rotating Extruder manufactured by the Werner & Pfeiderer Corporation, 663 East Crescent Avenue, Ramsey, N.J. 07446;
5. The MPC/V Baker Perkins Twin Screw Extruder manufactured by the Baker Perkins Inc. Chemical Machinery Division, Saginaw, Mich. 48601;
6. The Berstorff twin screw or foam extrusion equipment manufactured by Berstorff Corporation, P. O. Box 240357, 8200-A Arrowridge Boulevard, Charlotte, N.C. 28224.

Generally, in certain preferred embodiments, double-screw extruders such as those aforesaid are used to mix the water-soluble and water-insoluble polymers, the flavor and/or sweetener composition or compositions and any other polymers and additives. These extruders are well known in the art.

Such extruders comprise an inner shaft member to which an outer screw member is affixed coaxially. In a double-screw machine, there are two shafts, each of which drives an outer screw member. The screws are intermeshed so that they subject the material being extruded to high-shear conditions, which contribute to dispersing the polymer or polymers destined to be the discrete entities in the polymer which will form the matrix in the particulate flavor and/or sweetener polymers of this invention.

These extruders also comprise an outer barrel member which encloses the screw or screws. Such extruders over their length can be fitted with different screws on the shaft and with different barrels surrounding the screws. Thus, over the length of the extruder various types and amounts of shear action can be used. The variation is carried out along the length of the extruder so that as various ingredients are initially introduced into the interior of the extruder, as the ingredients are initially mixed, and as the components become more highly mixed or dispersed, the mixing and shear action can be varied to obtain the particle size and amount of the polymer material to be dispersed entities in the matrix.

After the extrusion, the extrudate is usually cooled. This can be accomplished by suitable means such as belts, blowers, liquids, and the like. The cooled extrudate comprises a matrix with dispersed entities. This extrudate is then comminuted to provide the finished particles by means known in the art.

In addition to the use of a single extruder, it will be apparent from this description that a series of extruders can be used to form extrudate. Thus, a functional composition with or without flavor and/or sweetener composition can also be added. It can be desirable not to mix this functional composition into the bulk as thoroughly as the dispersed entities are mixed. A functional composition is herein understood to mean a polymer or other material which will provide a desired function to the particles. Thus, a breath freshener and/or pharmaceutical composition, e.g., antibiotic such as a tetracycline can be added to provide obvious functions to the flavored and/or sweetened polymers of this invention.

The extrusion and subsequent comminution enable the facile control of the size of the dispersed entities and the overall size of the particulate flavoring and/or sweetener polymers. This in turn provides control over the ultimate properties of the particulate flavor and/or sweetener polymers as taught herein.

BRIEF DESCRIPTION OF THE DRAWINGS

FIGS. 13, 14 and 15 are schematic block flow diagrams of apparatus useful in effecting a process for preparing a chewing gum of our invention comprising a chewing gum base having dispersed therein sweetener and/or flavor bearing particles of our invention commencing with the extrusion and simultaneous foaming of the polymer-flavor-sweetener mixtures; pelletizing of the extrudate and proceeding to the cryogenic grinding of the resulting extruded pellets followed by suspension of the cryogenically ground polymer-flavor-sweetener mixture in the chewing gum base.

FIG. 19 is an elevation, partly in section, of extruder apparatus used in preparing particulate sweetener and/or flavor bearing polymeric particles according to our invention.

DETAILED DESCRIPTION OF THE DRAWINGS

Figure 1:
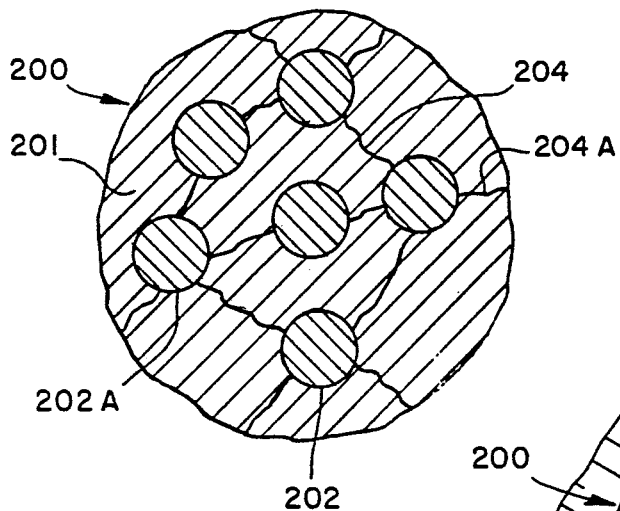
FIG. 1 is a cross-sectional view of a flavored and/or sweetened particle comprising flavor and/or sweetener composition-containing solid water-soluble polymer in interconnected pores of flavor and/or sweetener composition containing solid water-insoluble polymer matrix.

FIG. 1 is cross-section of a flavored and/or sweetened particle comprising water-soluble polymer containing flavoring and/or sweetening compositions in interconnected pores of a water-insoluble polymer matrix.

Particle 200, representative of one embodiment of the particulate flavoring and/or sweetener polymers of this invention comprises matrix 201 of water-insoluble polymers such as polyethylene or copolymers of ethylene and vinyl acetate. Water-soluble polymer entities 202 and 202A are generally contained in matrix 201 and they are interconnected by pores 204 and 204A containing the water-soluble polymer.

Figure 2:
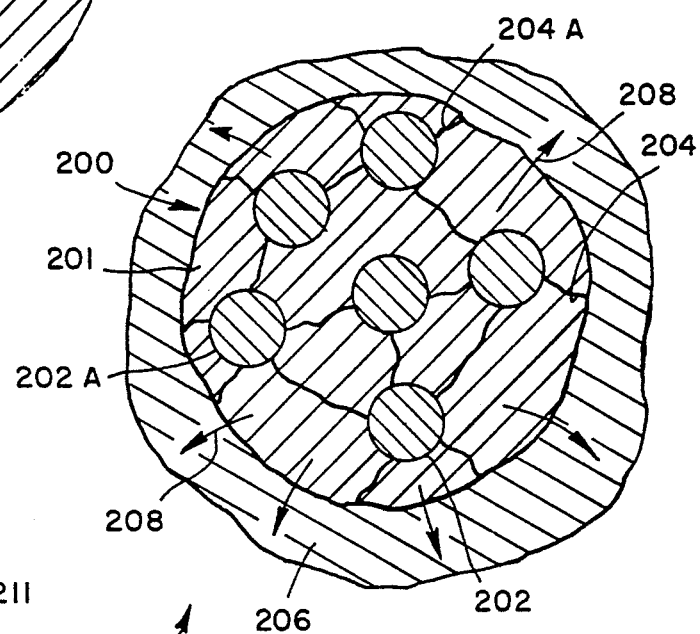
FIG. 2 is a cross-sectional view of the particle of FIG. 1 in a chewing gum base during mastication.
Figure 3:
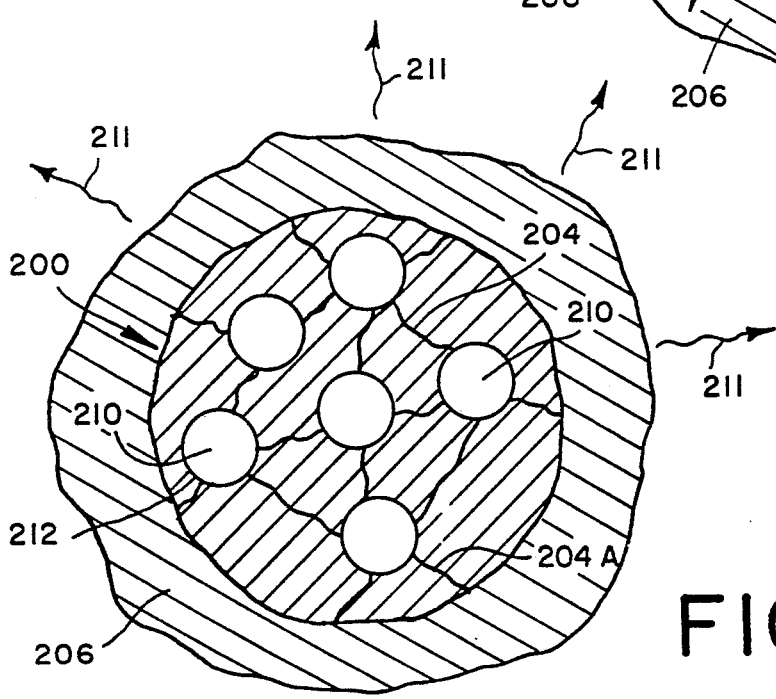
FIG. 3 is a cross-sectional view of the particle of FIG. 1 showing the water-insoluble polymer with interconnected pores after dissolution of the water-soluble polymer with chewing gum base on mastication.

Referring to FIGS. 2 and 3, when particle 200 is masticated in chewing gum base 206, the water-soluble polymer located in pores 202 and 202A dissolves in water as shown by arrows 208, and flavoring and/or sweetener composition (not separately shown) coming from water-soluble polymer 202 as well as, if desired, from water-insoluble polymer 201 emanates from the surface of the chewing gum as shown by arrows 211. Of course, FIGS. 1, 2 and 3, show the water-insoluble polymer being the matrix 201 and the water-soluble polymer being in the dispersed entities 202.

Figure 4:
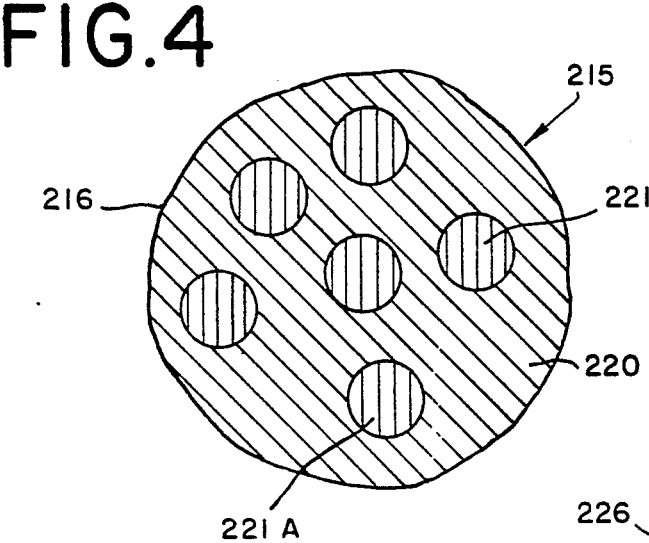
FIG. 4 is a cross-sectional view of a particle with water-insoluble polymer in a water-soluble matrix.
Figure 5:
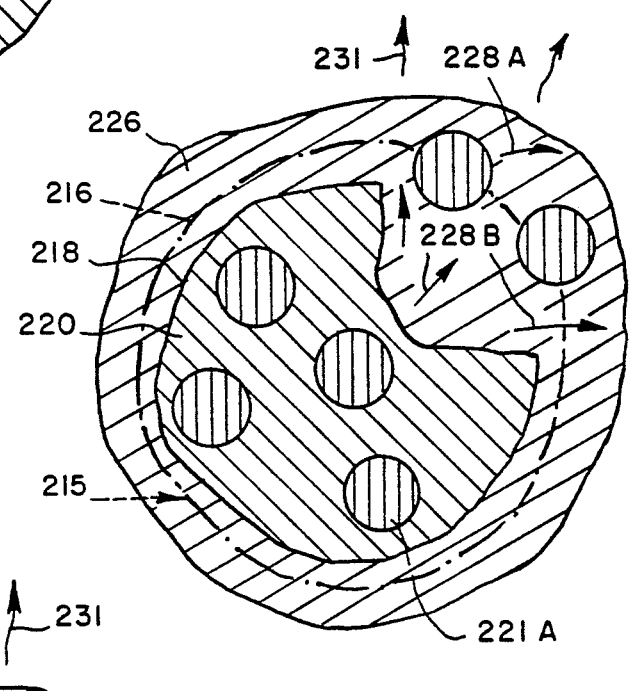
FIG. 5 is a cross-sectional view of the particle of FIG. 4 in a chewing gum base during mastication.
Figure 6:
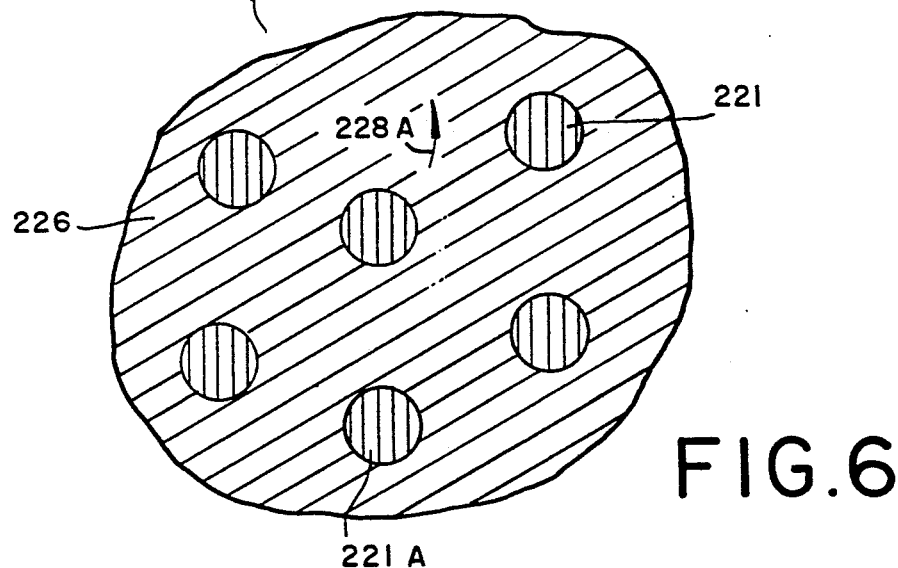
FIG. 6 is a cross-sectional view of the particle shown in FIG. 4 in a chewing gum base during mastication.
Figure 7:
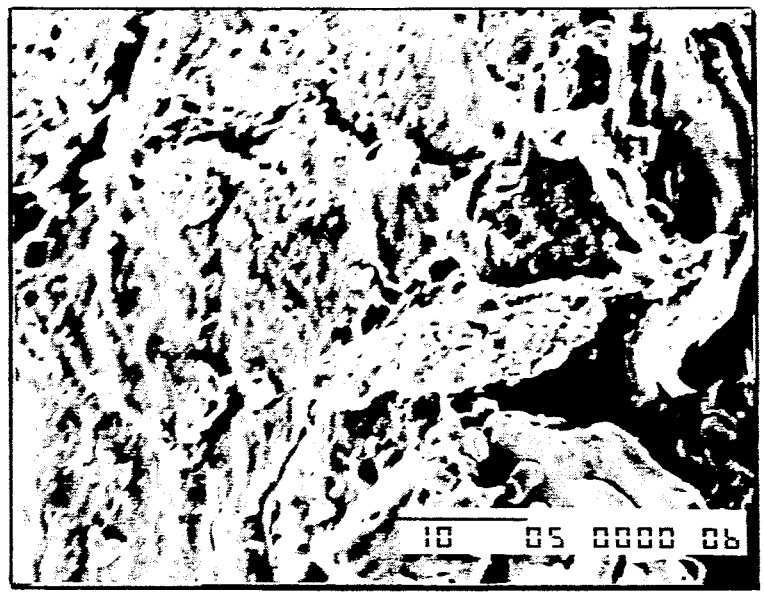
FIG. 7 is an electron micrograph (1000 X) of a sweetener particle (low density polyethylene/POLYOX ®, with the weight ratio of low density polyethylene:-POLYOX ®:saccharin being 30 50:20).
Figure 8:
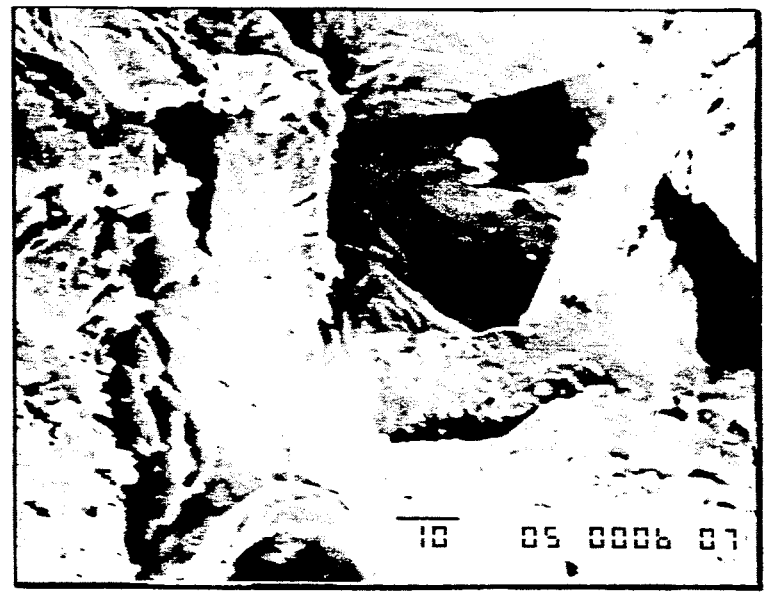
FIG. 8 is an electron micrograph of the same substance as FIG. 7, exposed to water.

Conversely, the water-soluble polymer can be the matrix and the water-insoluble polymer can be the dispersed entities as shown in FIGS. 4, 5 and 6. In FIG. 4, particle 215 has water-soluble polymer 220 as the matrix and water-insoluble polymer 221 and 221A the dispersed entities. The edge 216 of particle 215 is shown. When particle 215 is placed in a chewing gum base 226 shown in FIGS. 5 and 6, water-soluble polymer 220 begins dissolving at 216 and looses a substantial amount of water-soluble polymer as shown by diminished edge 218. Meanwhile, the water-insoluble dispersed entity particles 221 leave polymer particle 215 and become independently immersed in the chewing gum base 226. Flavor and/or sweetener composition is released from water-soluble polymer 220 and, if desired, water-insoluble polymer 221 is indicated by arrows 228A and 228B. The flavor and/or sweetener composition ultimately leaves the surface 230 of chewing gum base 226 as shown by arrow 231. Particles 221 and 221A are contained in the chewing gum base as shown in FIGS. 5 and 6.

Of course, both particles 200 having water-insoluble polymer 201 is the matrix and water-soluble polymer 202 is the dispersed entities and particles 215 having water-soluble polymer 220 as the matrix and water-insoluble polymer 221 as the separate entities can be used simultaneously with the same or different flavor or sweetener compositions.

Figure 9:
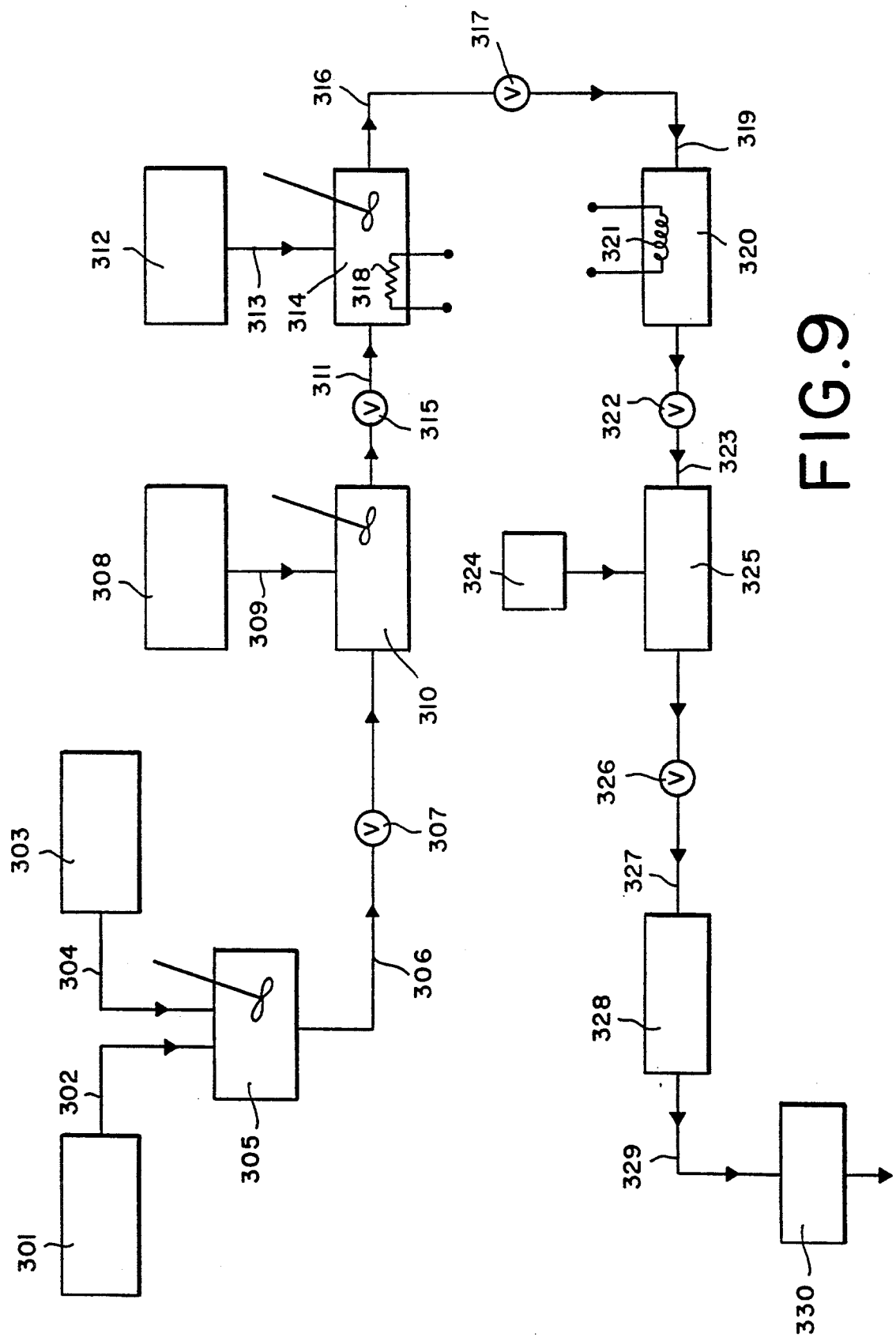
FIG. 9 is a schematic block flow diagram of apparatus used in preparing the sweetener and/or flavor bearing polymeric particles of our invention.

FIG. 9 is a schematic block flow diagram of apparatus used in forming the flavor and/or sweetener-containing polymeric particles of our invention.

Polyethylene (water-insoluble polymer) at location 301 is passed through line 302 into Banbury mixer 305 where it is mixed with water-soluble polymer (e.g., POLYOX®) from location 303 which is passed through line 304 into Banbury mixer 305. The resulting mixed polymeric composition is then passed through line 306 passed valve 307 into mixer 310 where it is admixed with sweetener from location 308 which is passed through line 309 into mixer 310. The resulting sweetener-water-soluble polymer-water-insoluble polymer mixture is then passed through line 311 through valve 315 into mixer 314 supplied with heating means 318. In mixer 314 the resulting sweetener-polymer mixture is admixed with flavor oil from location 312 which is passed through line 313 into mixer 314. The resulting polymer-flavor-sweetener mixture after being thoroughly mixed and in a heated stage is then passed through line 316 passed valve 317 into cooling apparatus 320 supplied with cooling coils 321. The resulting cooled polymer is then passed through line 323 passed valve 322 into a cryogenic treatment apparatus 325 where it is admixed with liquid nitrogen from location 324. The cryogenically treated tow is then passed through line 327 passed valve 326 into cryogrinder 328 where it is ground and the ground powder is passed through line 329 into powder supply holder 330 where it is used to supply apparatus as shown in FIG. 10.

Figure 10:
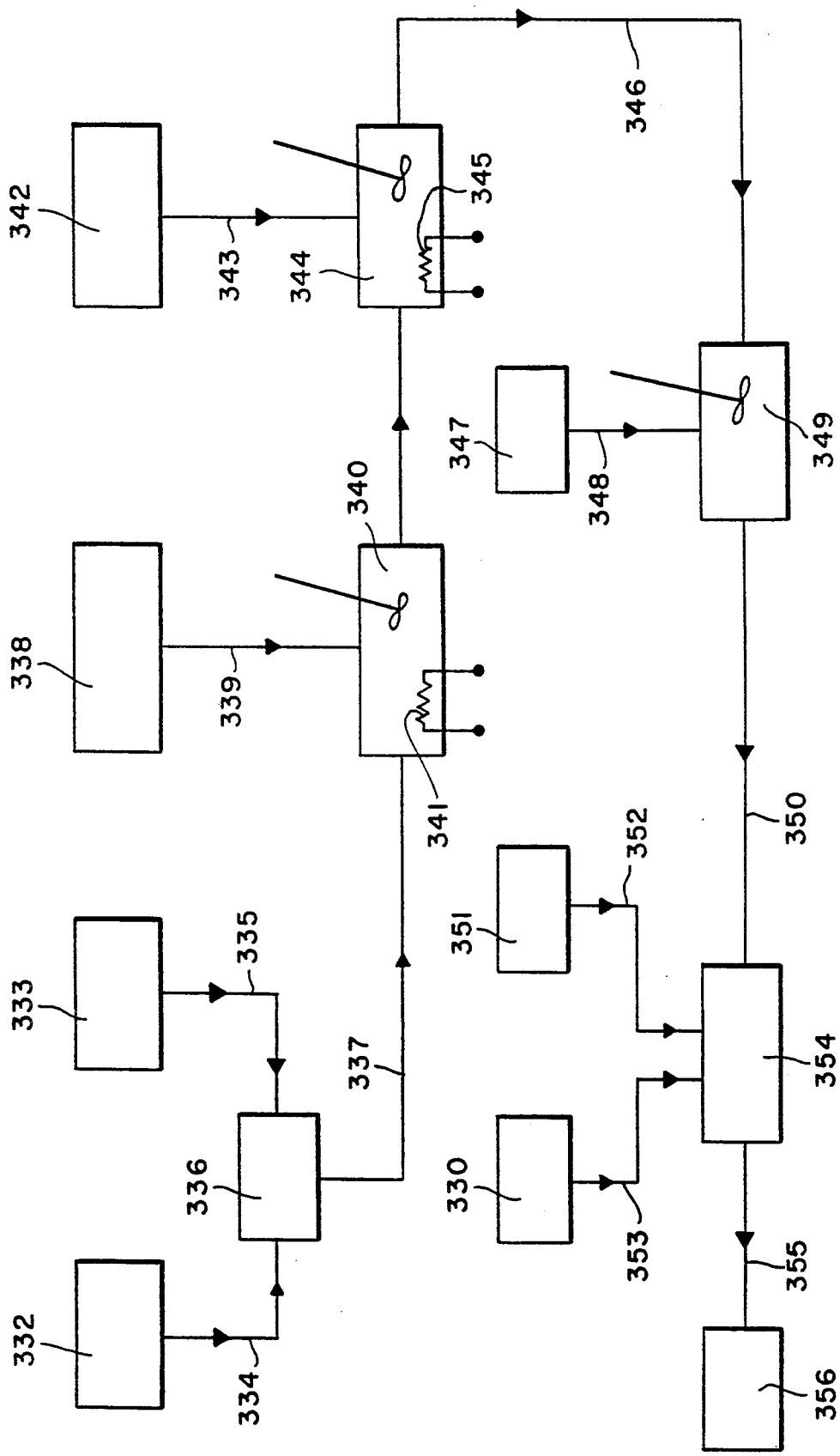
FIG. 10 is a schematic block flow diagram of apparatus useful in forming a chewing gum composition of our invention comprising a chewing gum base having dispersed therein flavor and/or sweetener bearing polymeric particles of our invention which apparatus utilizes the product prepared according to the apparatus of FIG. 9.

FIG. 10 is a schematic block flow diagram of apparatus used to produce the chewing gum of our invention which comprises a chewing gum base having dispersed therein sweetener and/or flavor bearing polymeric particles shown to be prepared according to FIG. 9 as described, supra.

Chewing gum base from location 332 is passed through line 334 into mixer 336 where it is mixed with corn syrup from location 333 which is passed through line 335 into mixer 336. The resulting chewing gum base/corn syrup mixture is passed through line 337 into heated mixer 340 where it is mixed with sweetener such as powdered sugar from location 338 which is passed into mixer 340 through line 339. The resulting sweetened chewing gum base/corn syrup mixture is then passed into heated mixture 344, heated with heating coil 345 where it is mixed with sugar from location 342 which is passed into the heated mixture 344 through line 343. The resulting heated sweetened corn syrup/chewing gum base mixture is then passed through line 346 into mixture 349 where it is mixed with glycerine from location 347 which glycerine is passed through line 348 into mixer 349. The resulting fluid glycerine-chewing gum/corn syrup/sweetener mixture is then passed through line 350 into mixer 354 where it is mixed with sugar from location 351 passed through line 352 into the mixer 354; as well as flavor/sweetener powder in holding vessel 330 which is part of the apparatus of FIG. 9. The flavored polymeric material is then passed through line 353 into the mixer 354 where it is mixed with the sugar and the glycerine/corn syrup/chewing gum fluidized mixture. The resulting mixture is then passed through line 355 where it is formed into chewing gum rolls at location 356.

FIGS. 11, 13, 14 and 15 are schematic cut-away elevation diagrams of the apparatus useful in carrying out the process of our invention during the operation of said apparatus.

Figure 11:
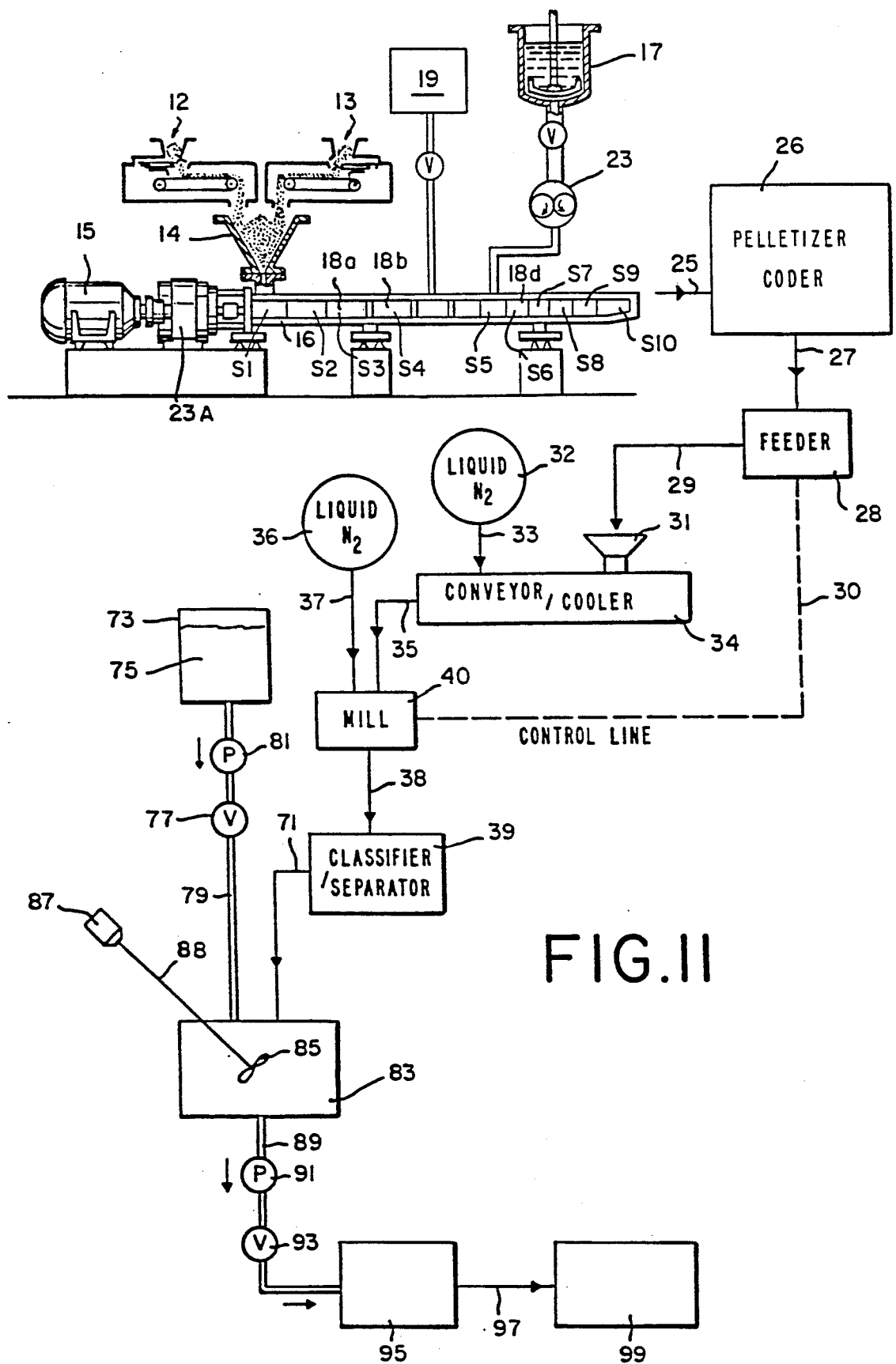
FIG. 11 is a schematic block flow diagram of apparatus useful in effecting a process used in preparing the flavor and/or sweetener bearing particles of our invention commencing with the extrusion of polymeric-flavor-sweetener mixture, pelletizing of the extrudate and proceeding to the cryogenic grinding of the resulting extruded pellets followed by suspension of the cryogenically ground polymer-flavor-sweetener mixture in the chewing gum base.

Motor 15 drives the extruder screws located at 23A in barrel 16, the extruder being operated at temperatures in the range of from about 150° C. up to about 250° C. At the beginning of the barrel, resin at source 12 optionally together with additives, e.g., breath fresheners, processing aids and colors at location 13 is added via addition funnel 14 into the extruder Simultaneously (when the operation reaches "steady state"), flavor material is added to the extruder at one, two or more of barrel segments 3-8 (shown as S3, S4, S5, S6, S7 and S8 in FIGS. 11, 13, 14 and 15) of the extruder (which may be a twin screw or single screw extruder) at locations 18a, 18b, 18c and 18d by means of gear pump 23 from source 17. Optionally, from source 19 (shown only in FIGS. 13 and 15) into barrel segments 5-10 (shown as S5, S6, S7, S8, S9 and S10 in FIGS. 11, 13, 14 and 15), gaseous or liquid blowing agents, e.g., nitrogen, carbon dioxide and the like may be optionally added simultaneously with the addition of the flavor Simultaneously as shown in FIG. 11 sweetener from location 19 may be added intimately or continuously into barrel segments 4-10 (shown as S4, S5, S6, S7, S8, S9 and S10 in FIG. 11). The feed rate range of resin is about 80-300 pounds per hour. The feed rate range of the flavor as well as the sweetener is between 1.01 and 400% of the feed rate range of the resin. In the event that a blowing agent is used, the blowing agent rate range is such that the pressure of the gas or the pressure over the liquid being fed into the extruder is between about 50 and 200 psig. If desired (as shown in FIGS. 14 and 15) the extruded ribbon or cylinder may be passed through water bath 20 and pelletizer 21 into collection apparatus 21a. The water cooling and pelletizing operation may be carried out in any conventional pelletizer 26 with extrudate tow entering through line 25 and leaving through line 27.

The resulting pellets are then passed into feeder 28 which is controlled through control line 30 insofar as the rate of feeding into hopper 31 is concerned (depending upon the rate of operation of the cryogenic mill 40). The resulting pellets are then passed into conveyor/cooler 34 where they are cooled in a direct contact fashion with liquid nitrogen being passed into the conveyor/cooler from holding tank 32 through line 33. The cryogenically cooled pellets are then passed through line 35 into mill 40 which is also cooled using liquid nitrogen from tank 36 through line 37. As stated, supra, the rate of operation of the mill controls the rate of operation of the feeder for feeding the pellets coming from the pelletizer 26 into hopper 31. The milled polymeric particles are then passed through line 38 into classifier/separator 39 where the particles are classified and sorted and groups of particles having various diameter ranges are used for the purpose of incorporation into chewing gum bases.

Figure 12:
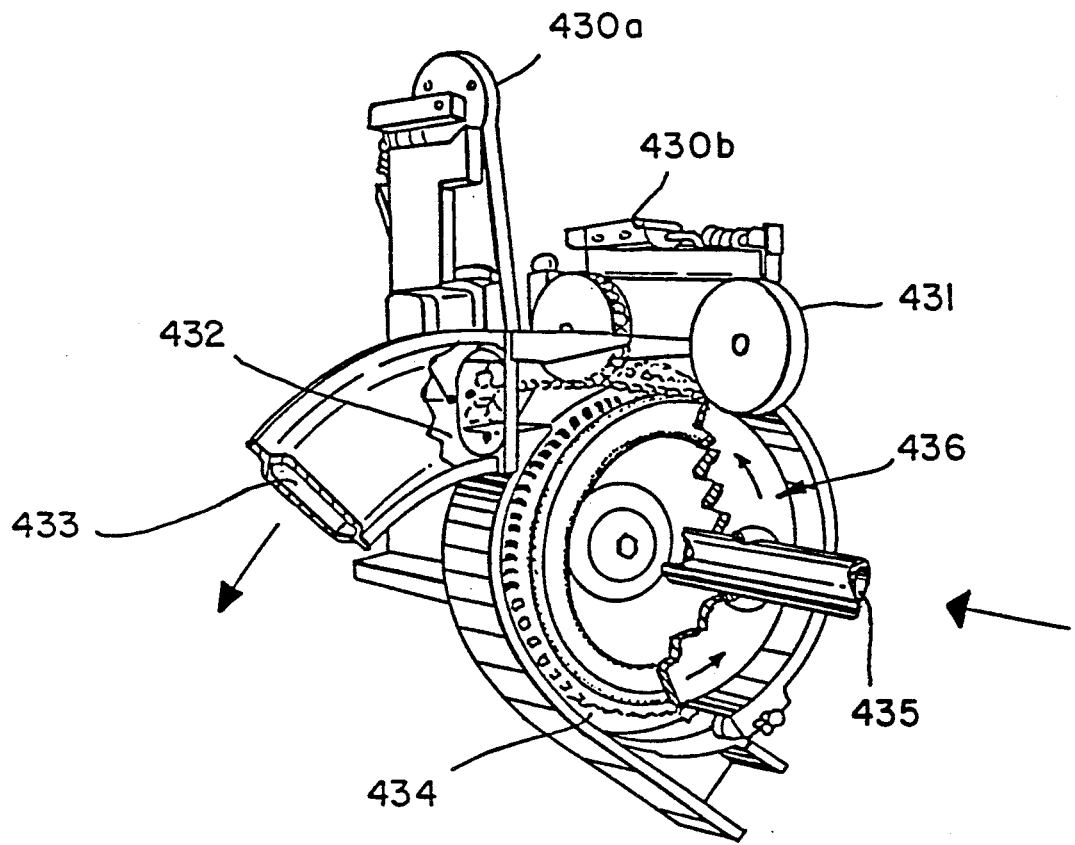
FIG. 12 is a cut-away perspective diagram of a pelletizing apparatus used in conjunction with the extrusion apparatus of FIG. 11 whereby the extruded tow is pelletized.
Figure 13:
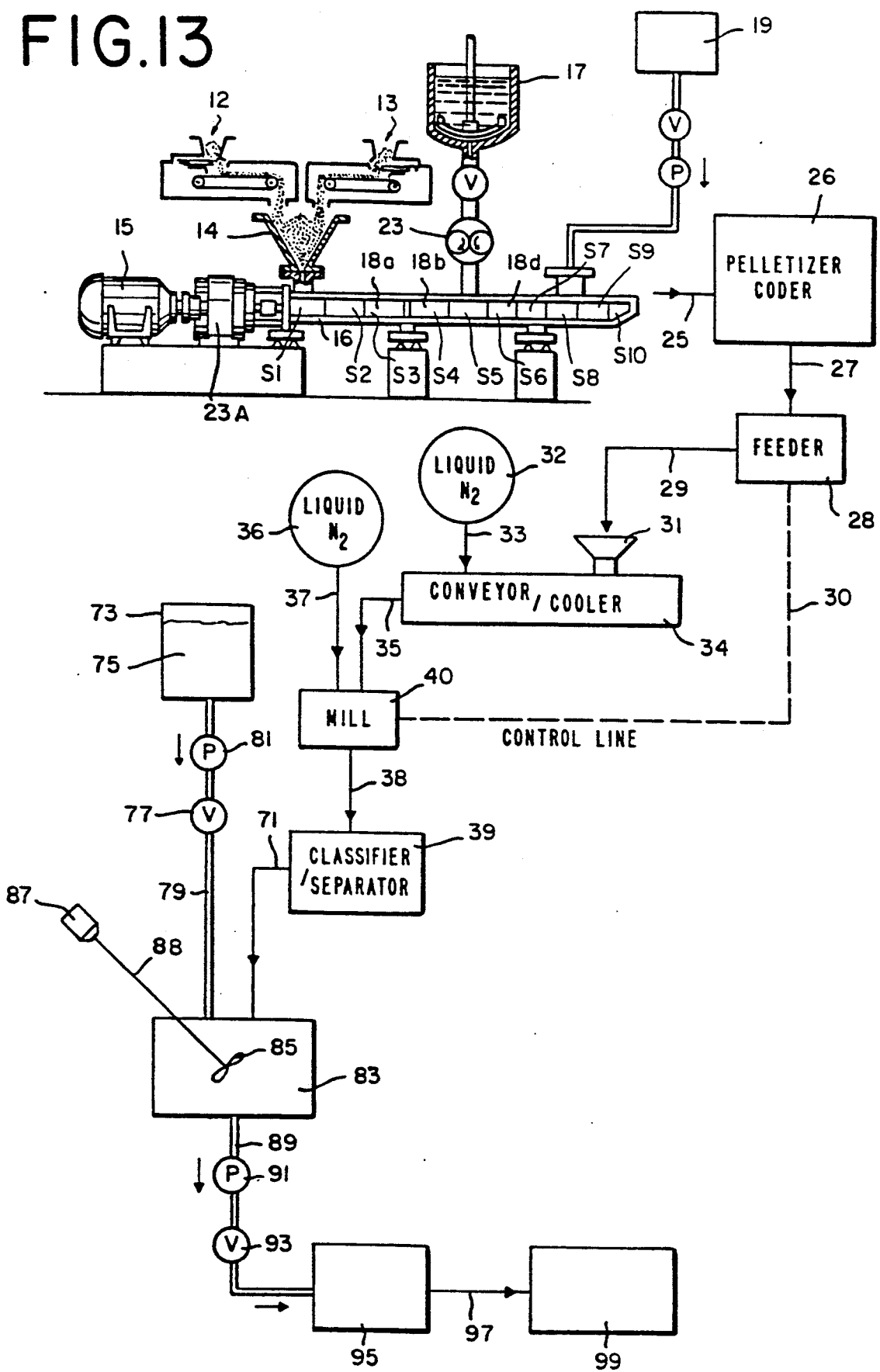
Figure 14:
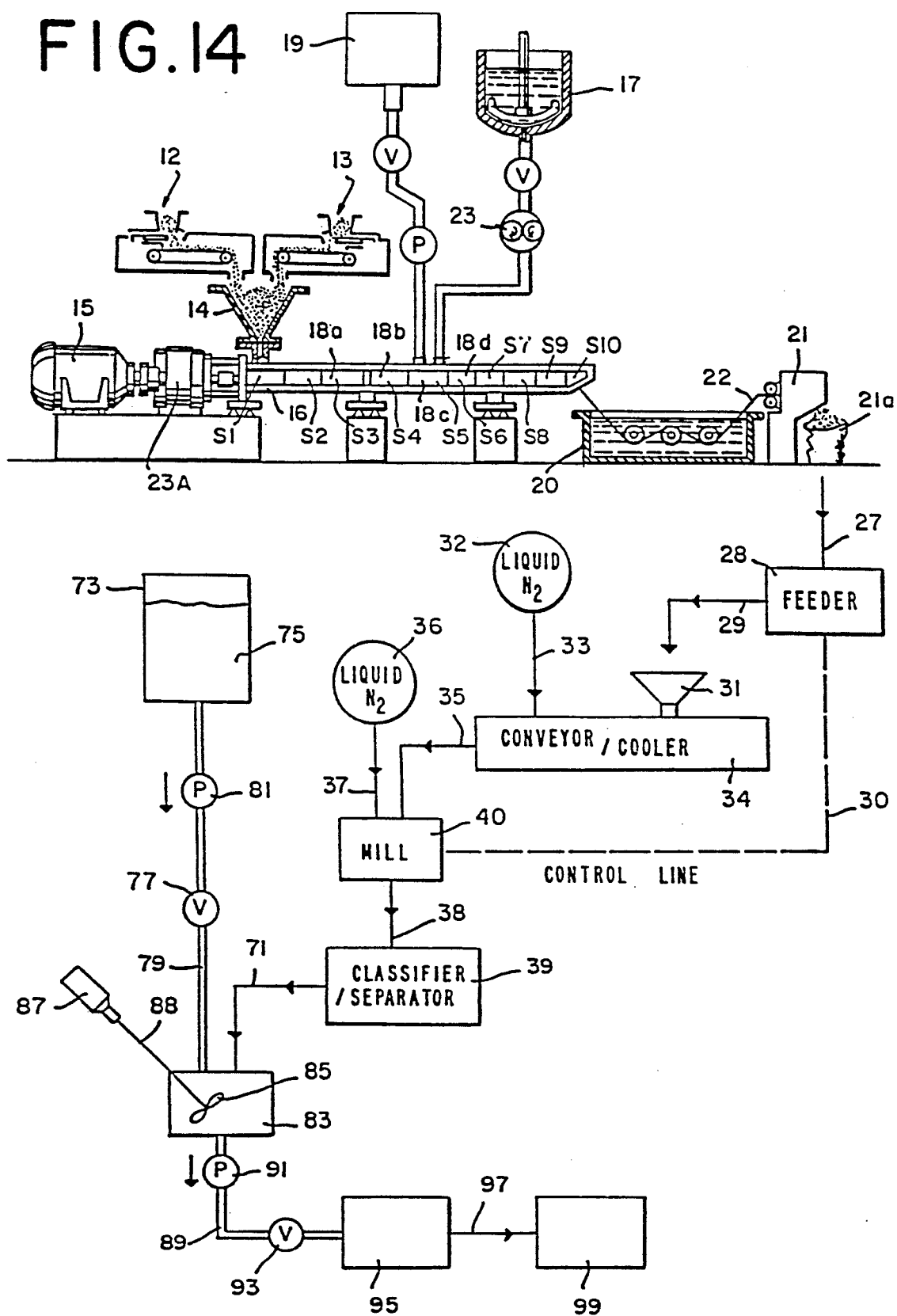

FIG. 12 is a detailed cut-away perspective view of such a pelletizer as is used in conjunction with the apparatus of FIGS. 11 and 13. The extruded material coming from the extruder is fed into pelletizer at zero pressure at location 434. The pelletizer is operated using a spinning extrusion die 436 and operated by means of a rotating wheel 434. Moving pellet knife 431 and dual knife units 430a and 430b cause pellets to be formed which fly into a cooling water stream 432. The resulting pellets which are formed and contain flavor and/or sweeteners exit from the pelletizer at 433.

Our invention incorporates by reference the invention covering the process for forming the cryogenically ground organoleptic composition bearing particles filed on Oct. 19, 1984 as application No. 663,681, now U.S. Pat. No. 4,934,609 issued on Jun. 19, 1990.

The nature of the cryogenic grinding apparatus useful in the practice of our invention is exemplified by several of those set forth in "Plastics Technology/Manufacturing Handbook And Buyers' Guide", Volume 30, No. 7, Mid-June 1984, pages 234, 240, 242 and 243, published by the Bill Publication Corporation of New York, N.Y. and are exemplified as follows:

1. The "CRYO-GRIND ®" cryogenic grinding system manufactured by the Air Products and Chemicals Inc. of Allentown, Pa.
2. Cryogenic Pulverizers manufactured by Pallmann Pulverizers Co., Inc.
3. Wedco cryogenic pulverizing system manufactured by Wedco, Inc.

FIG. 19 sets forth in schematic form another diagram of an extruder used to make the flavor and/or sweetener polymeric particles of our invention.

Thus, FIG. 2E is an elevation, partly in section, of apparatus 100 showing the practice of a preferred aspect of the invention It comprises screw extruder 118 for compounding of water-insoluble resin with water-soluble resin while simultaneously adding flavor and/or sweetener composition into the hollow portion of the barrel of the extruder and incorporates the pelletizing apparatus used in pelletizing the extruded product of the extrusion operation.

Motor 115 drives extruder screws 118 in barrel 116, the extruder being operated at temperatures in the range of about 150° C. to about 250° C. At the beginning of the barrel resin from hopper 112 (e.g., water-insoluble resin such as polyethylene) together with additives, such as opacifiers, processing aids, colors, pharmaceutical materials such as antibiotics, breath fresheners and water-soluble resin (e.g., POLYOX ®) from hopper 113, together with any desired additives as conducted via addition hopper 114 into extruder 102. Simultaneously, when the operation reaches "steady state", a flavor composition is added to the extruder at one, two or more of barrel segments 3-8 of the twin-screw extruder at locations 118a, 118b, 118c and 118d by means of gear pump 123 from tank 117. From line 119, optionally, gaseous or liquid blowing agents, e.g., nitrogen, carbon dioxide, and the like can be added simultaneously with the addition of the flavor composition.

The feed rate range of the resin is about 80-300 pounds per hour. The feed rate range of the flavorant is between one and 70 percent of the feed rate range of the resin. If desired, the blowing agent rate range is such that the pressure of the gas or the pressure over the flavorant being fed into the extruder is between about 50 and 1000 psig. Cooling means 140 comprises passing extrudate 141 onto belt 145 being cooled from the side opposite to that of the extrudate using water spray 146 coming from nozzles 144, from manifold 143 which, in turn, is fed by line 142.

Figure 16:
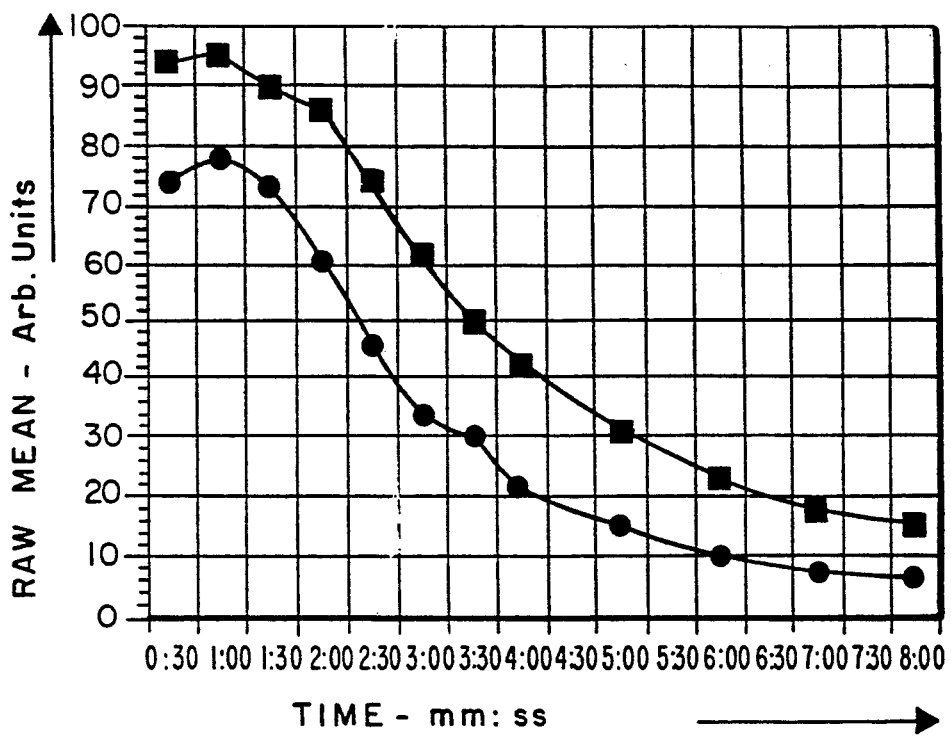
FIGS. 16 and 17 are graphs of time (on the "X" axis) versus measure of flavor intensity on mastication of chewing gums with inclusion of the system of our invention, the flavored and/or sweetened polymer particles of our invention and without system of our invention but still being flavored and/or sweetened.

FIG. 16 is a graph of flavor intensity (on a scale of 0-100) versus time (in 30 minute units) showing time of chewing. The graph indicated by reference numeral 160 is a graph a system of our invention containing PO- LYOX ®, polyvinyl acetate and strawberry flavor. The graph indicated by reference numeral 162 is a graph for a system not within the scope of our invention showing strawberry flavor in a chewing gum base without being encapsulated in a polymer of any type.

Figure 17:
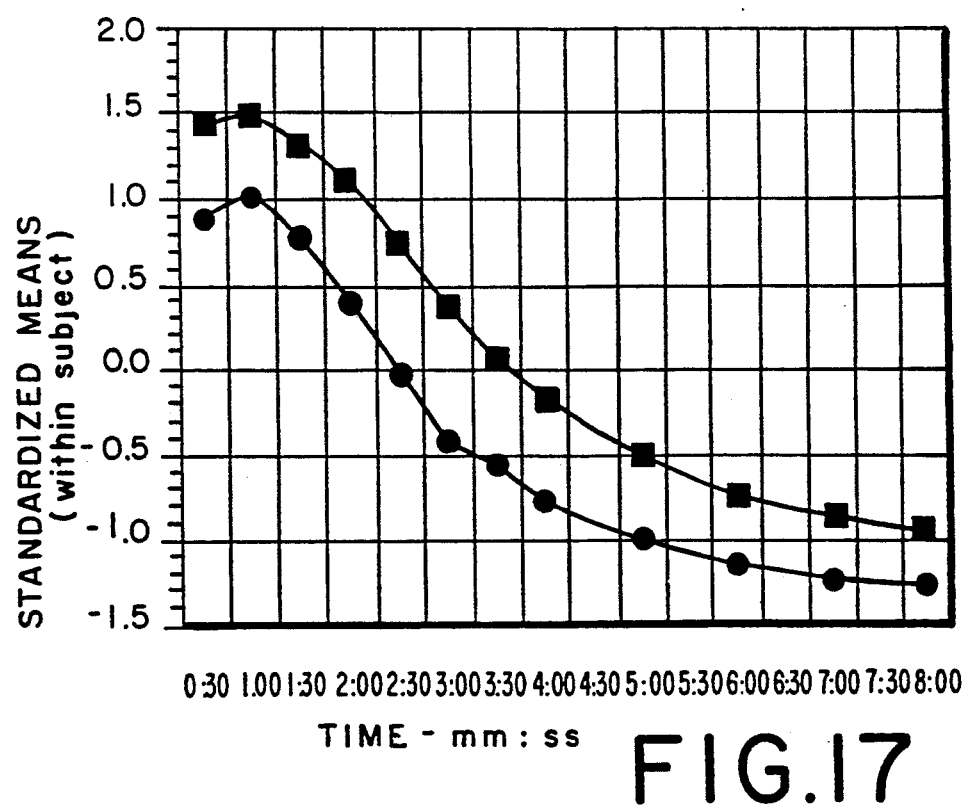
Figure 18:
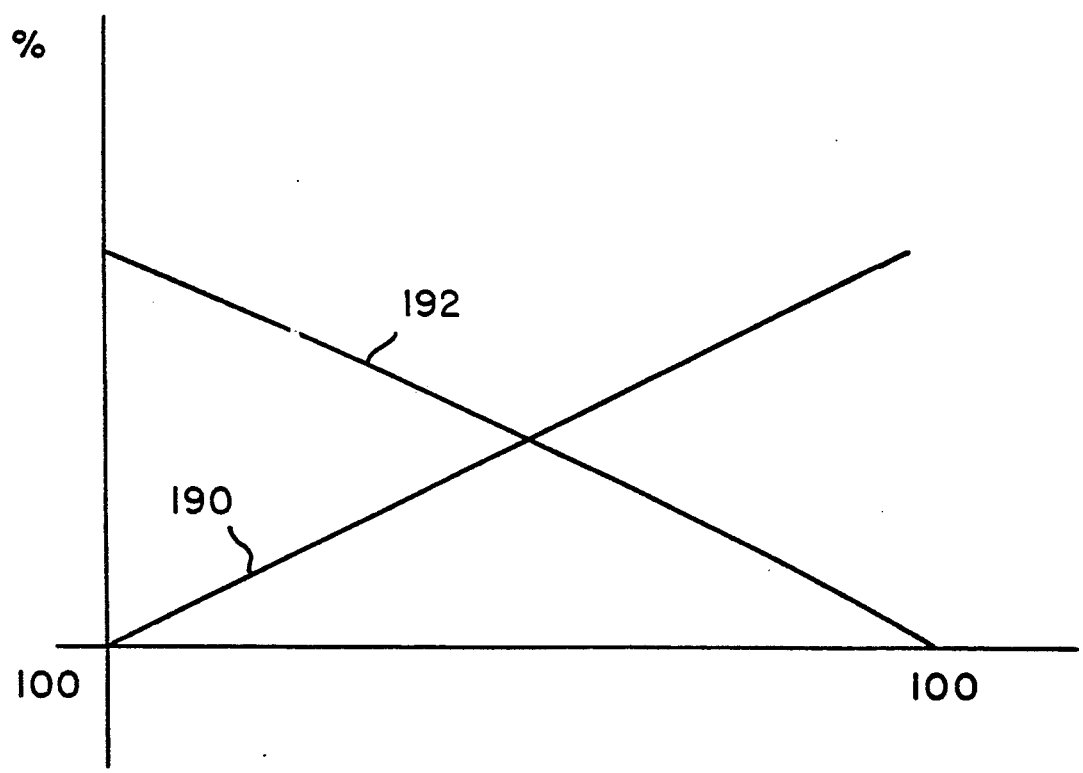
FIG. 18 is a composite graph showing on the "X" axis the percentage of low density polyethylene (water-insoluble polymer) and polyethylene glycol, "POLYOX®", (water-soluble polymer) and on the "Y" axis, percent flavor in flavor polymer particle at a given time after commencement of mastication of the chewing gum containing such particles.

The same comparative graphs of FIG. 16 are set forth in FIG. 17. FIG. 17 is a graph of flavor intensity shown using standardized means on a scale of from −2 up to +2 (on the "Y" axis) versus time of chewing (on the "X" axis). The graph indicated by reference numeral 170 is one using the flavor/polymeric system of our invention where the flavor/polymeric system contains strawberry flavor, POLYOX ® as the water-soluble polymer, and polyvinyl acetate as the water-insoluble polymer. The graph indicated by reference numeral 172 is a graph showing the use of a system which is not within the scope of our invention, wherein strawberry flavor is contained in the chewing gum base without any polymeric system involved. FIG. 18 is a composite graph showing percent flavor in the polymeric system of our invention at a given point in time of chewing versus percent of POLYOX ® (the water-soluble polymer) and low density polyethylene (the water-insoluble polymer). The graph indicated by reference numeral 190 is the graph of percent flavor in the system versus percent low density polyethylene. The graph indicated by reference numeral is the graph of percent flavor in the system versus percent POLYOX ® (water-soluble polymer).

EXAMPLE I

A strawberry flavored chewing gum was produced yielding the taste results as set forth in FIGS. 16 and 17. The strawberry flavored chewing gum is prepared as follows:

(A) 10 grams of a precompounded concentrate is prepared by placing in a Banbury mixer, a mixture containing 50% low density polyethylene (Allied 715 4000 centipoises at 140° C.:

30%—POLYOX ® polyethylene glycol (WRPA-3154);

20%—2-Methyl-2-pentenoic acid.

The resulting material was intimately admixed in the Banbury mixer with 186.5 grams of chewing gum base which is a mixture of:

44 grams—draffous maga grande gum base;
52 grams—corn syrup 43° be;
90 grams—10X powdered sugar;
0.5 grams—glycerine.

The results are shown in the graphs indicated by reference numeral 160 on FIG. 16 and reference numeral 170 on FIG. 17.

The graphs indicated by reference numeral 162 on FIG. 16 and 172 on FIG. 17 show the results when the 2-methyl-2-pentenoic acid is not included with low density polyethylene and POLYOX ® but simply added to the chewing gum base.

What is claimed is:

1. A chewing gum composition consisting essentially of a chewing gum base having dispersed therein sweetener and flavor bearing polymeric particles, each of said polymeric particles consisting essentially of:

(a) at least one water-soluble normally solid polymer;
(b) at least one water-insoluble normally solid polymer;
(c) (i) at least one flavor composition, a portion of which is incorporated in the water-insoluble polymer and a portion of which is incorporated in the water-soluble polymer; and (ii) at least one sweetener composition, a portion of which is incorporated in the water-insoluble polymer and a portion of which is incorporated in the water-soluble polymer;

the water-soluble polymer and the water-insoluble polymer being physically associated with each other and in such a manner that one is in the form of a multiplicity of discrete entities in a matrix of the other produced according to the process consisting essentially of the sequential steps of:

(a) first mixing a water-soluble polymer and a water-insoluble polymer to form a first polymer blend;
(b) then adding to the polymer blend at least one sweetener composition and at least one flavor composition;
(c) then mixing the resulting blend to form a second polymer blend;
(d) then cooling the resulting second polymer blend to a substantially solid state to form a substantially solid bland;
(e) then grinding the resulting substantially solid blend to form a particulate substantially solid flavor and sweetener composition; and then
(f) admixing the resulting particulate substantially solid flavor and sweetener composition with a chewing gum base.

* * * * *